Figure 9:
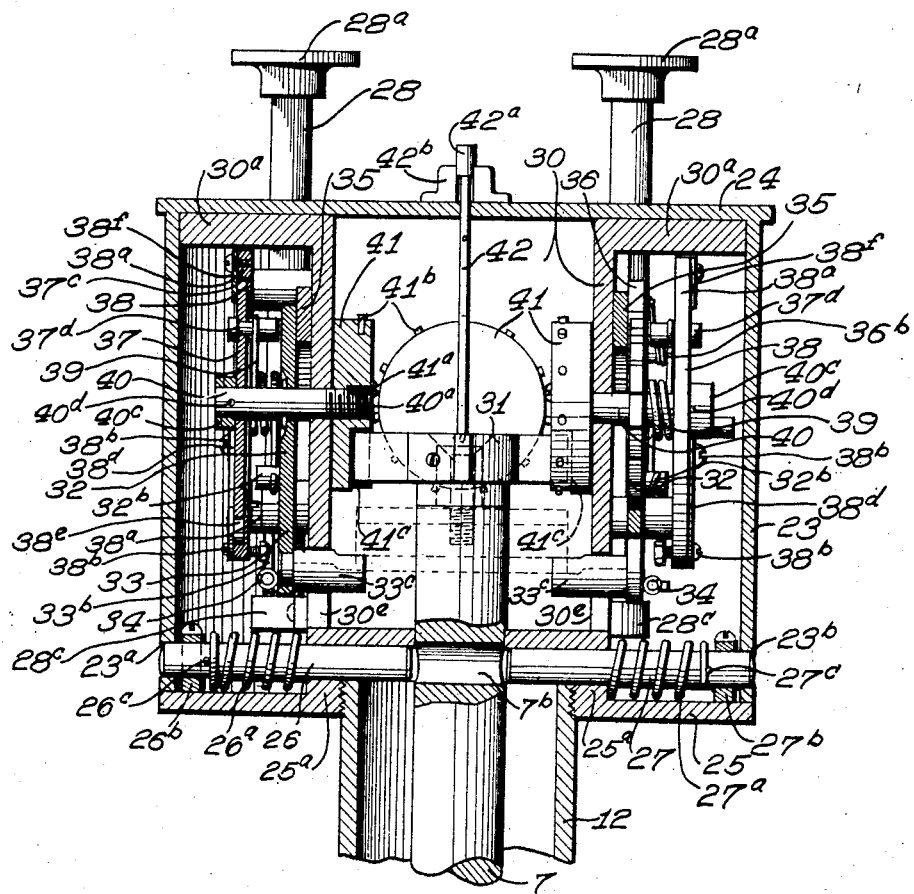

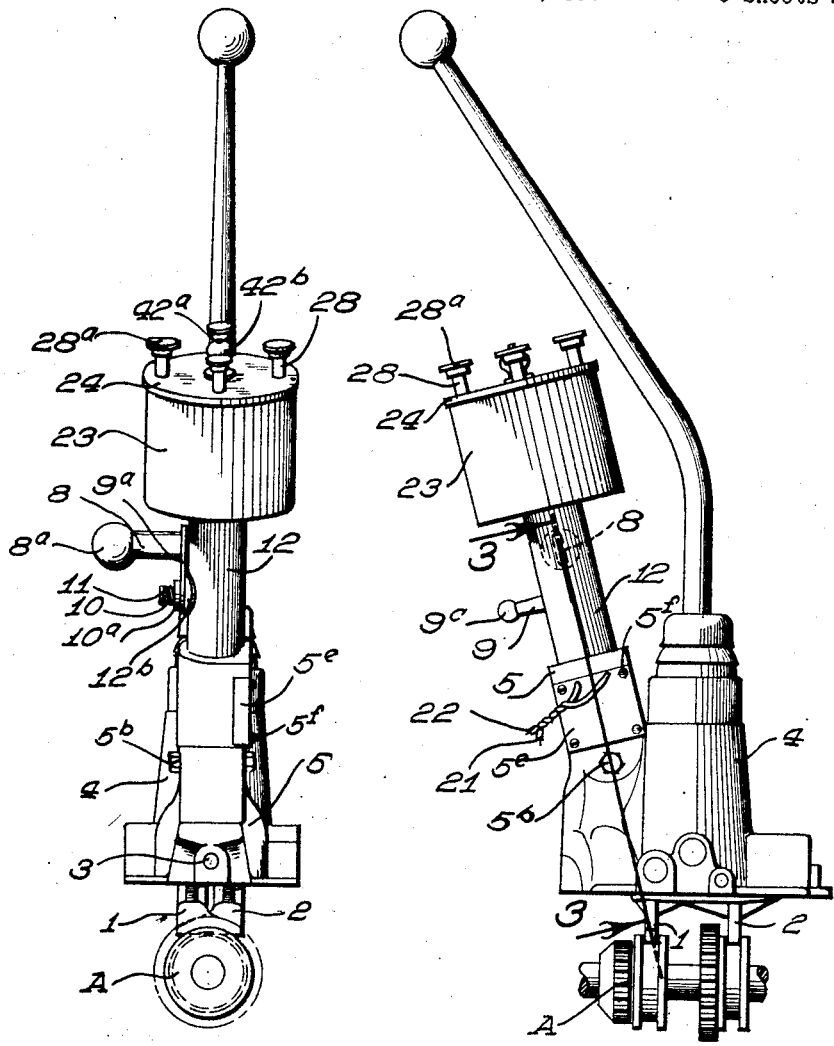

April 23, 1929. Z. RIDDLE 1,710,242
COMBINATION LOCKING MECHANISM FOR VEHICLES
Filed Feb. 26, 1927 5 Sheets-Sheet 2
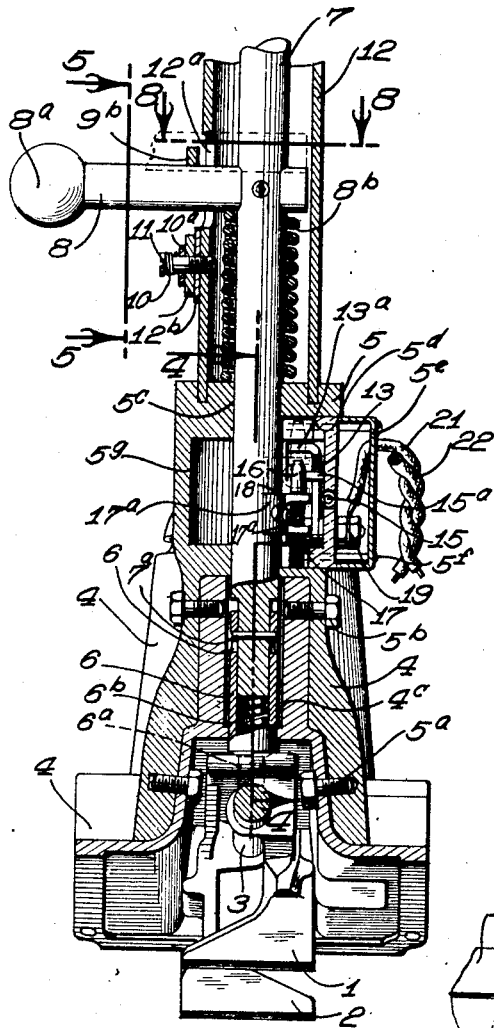
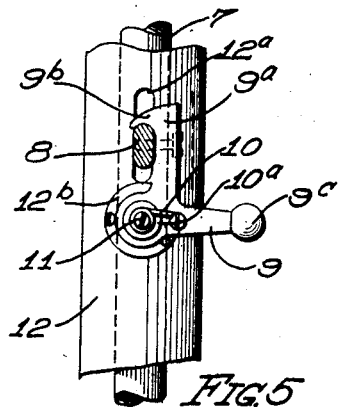
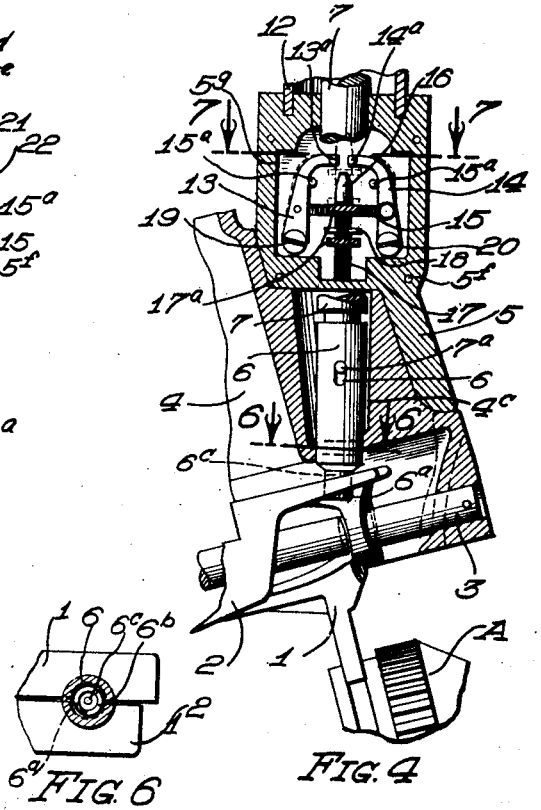
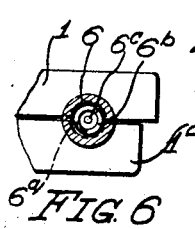
INVENTOR.
ZELIE RIDDLE
BY A.B.Bowman
ATTORNEY INVENTOR.
ZELIE RIDDLE
BY A. B. Bowman
ATTORNEY INVENTOR.
ZELIE RIDDLE
BY A.B. Bowman
ATTORNEY

INVENTOR.
ZELIE RIDDLE
BY
ATTORNEY

Patented Apr. 23, 1929.

1,710,242

UNITED STATES PATENT OFFICE.

ZELIE RIDDLE, OF SAN DIEGO, CALIFORNIA, ASSIGNOR OF ONE-FOURTH TO WAYNE B. HANCOCK AND ONE-FOURTH TO DEAN H. KIRK, BOTH OF LOS ANGELES, CALIFORNIA.

COMBINATION LOCKING MECHANISM FOR VEHICLES.

Application filed February 26, 1927. Serial No. 171,164.

My invention relates to a combination locking mechanism which is adapted to lock the ignition, as well as the power transmission mechanism, of vehicles, and the objects of my invention are: first, to provide a locking mechanism of this class for vehicles, which may be readily operated from the driver's seat for connecting and disconnecting the ignition system of the vehicle with and from a source of electrical energy and simultaneously locking and unlocking the transmission mechanism thereof; second, to provide a locking mechanism of this class whereby the ignition mechanism is disconnected from a source of electrical energy and the transmission mechanism is locked by the shifting of a lever when the transmission mechanism is in neutral position; third, to provide a combination locking mechanism, the release of which is controlled by means of a plurality of plungers, which may be separately adjusted so as to be shifted a different number of times for providing a variety of combinations for different vehicles or for the same vehicle at different periods of operation; fourth, to provide a novelly constructed co-acting plunger means for a combination locking mechanism; fifth, to provide novelly constructed combination plungers and novel means for adjusting the same to change the combination of the locking mechanism; sixth, to provide a novel electrical switch mechanism in connection with a locking mechanism of this class; seventh, to provide novel means for locking the transmission mechanism of the vehicle; eighth, to provide an auxiliary electrical switch means operative in connection with the transmission locking mechanism for disconnecting the ignition system of the vehicle when locking the transmission mechanism; ninth, to provide a mechanism of this class which locks the transmission mechanism in neutral position and in which the locking mechanism can only be operated when the transmission lever is in neutral position; tenth, to provide a mechanism of this class in which the operator of the vehicle can readily determine from his seat and at the top of the mechanism whether or not the mechanism is in locking position; eleventh, to provide a locking mechanism of this class which is practically inaccessible to unauthorized persons to tamper with the locking mechanism for unlocking the vehicle; twelfth, to provide a locking mechanism of this class which is applicable to the different makes of vehicle transmission and ignition mechanisms now in use; thirteenth, to provide a locking mechanism of this class which is very compact and may be positioned out of the way and still be readily accessible to the driver of the vehicle; fourteenth, to provide as a whole a novelly constructed combination locking mechanism for vehicles, and fifteenth, to provide such a locking mechanism which is very simple and economical of construction proportionate to its functions, durable, reliable, easy to operate, and which will not readily deteriorate or get out of order.

Figures 7, 8:
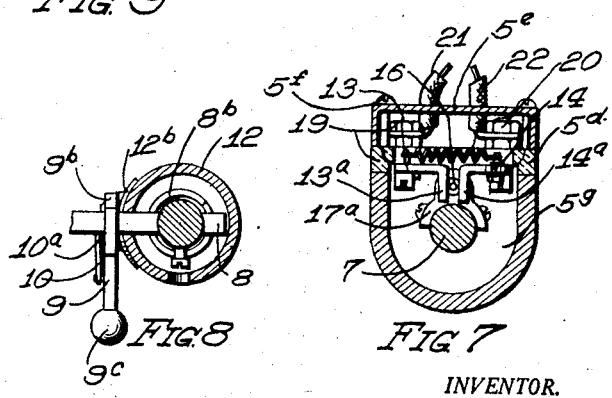
Figure 10:
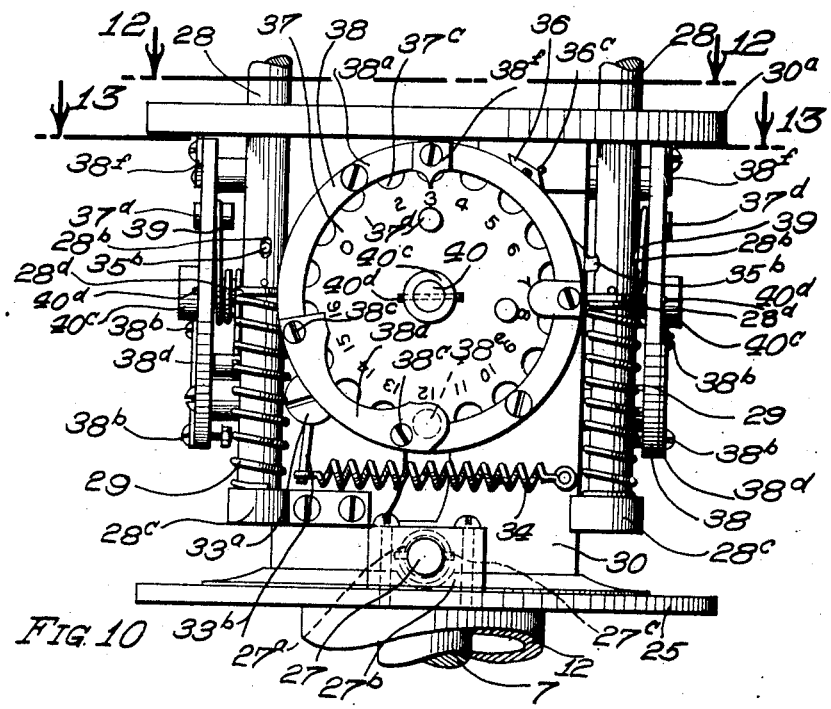
Figure 11:
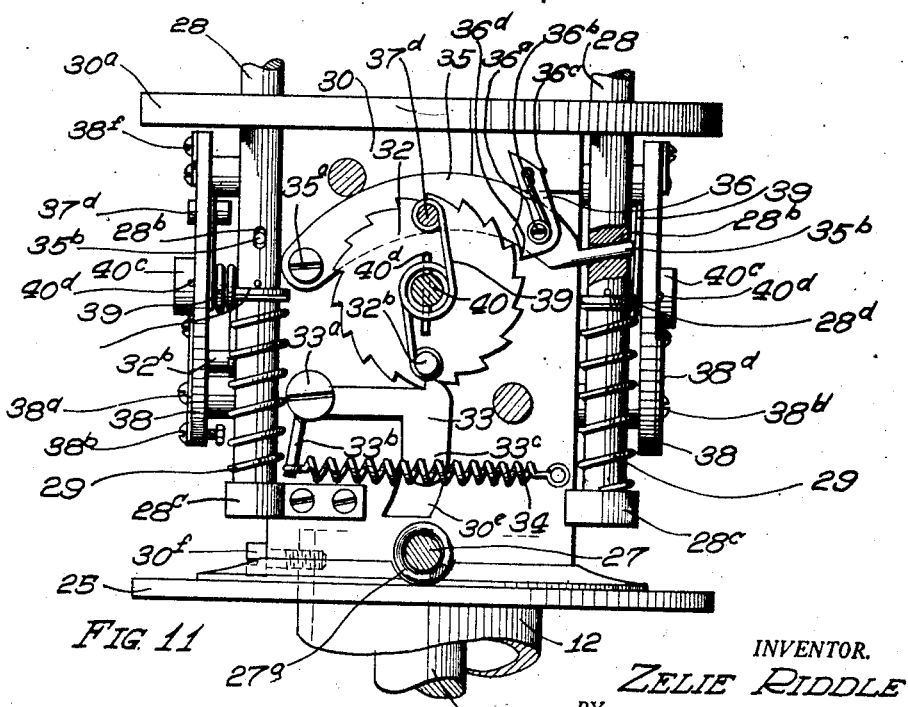
Figure 12:
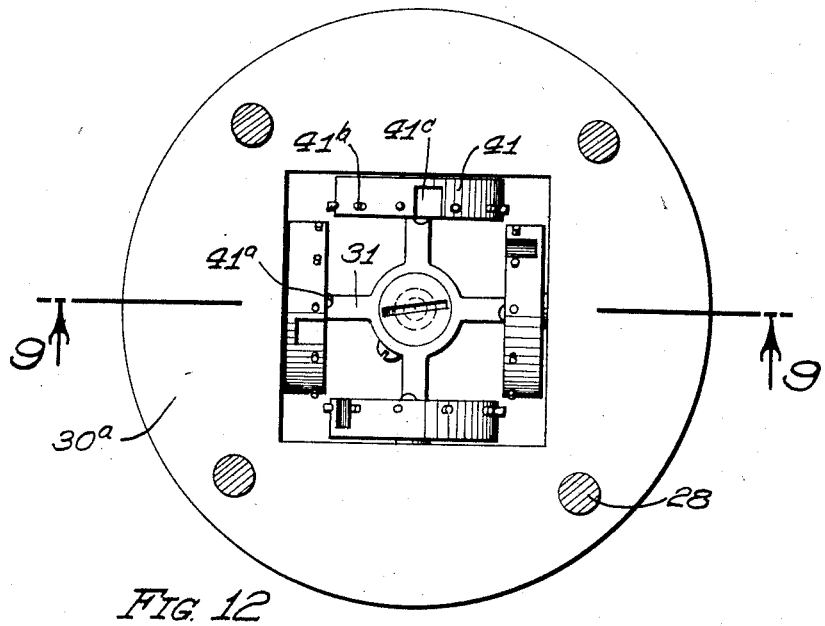
Figure 13:
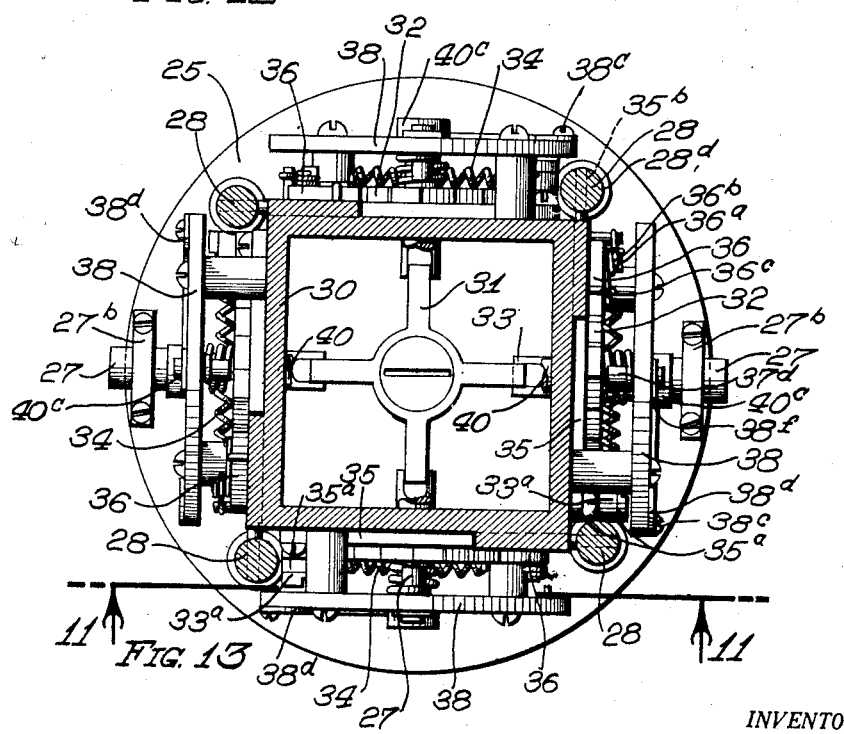

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a rear elevational view of my locking mechanism, shown in its relation with the gear shift lever and gear shift mechanism of a vehicle (in this case I have shown it in connection with an Overland transmission shifting lever and mechanism, shown fragmentarily); Fig. 2 is a side elevational view thereof; Fig. 3 is a longitudinal sectional view on an enlarged scale through 3—3 of Fig. 2; Fig. 4 is a longitudinal sectional view through 4—4 of Fig. 3; Fig. 5 is a fragmentary sectional and elevational view through the line 5—5 of Fig. 3; Fig. 6 is a sectional view through 6—6 of Fig. 4; Fig. 7 is a transverse sectional view through 7—7 of Fig. 4; Fig. 8 is a transverse sectional view through 8—8 of Fig. 3; Fig. 9 is a sectional view of the selecting combination portion of my locking mechanism, through 9—9 of Fig. 12, showing some of the parts in elevation to facilitate the illustration; Fig. 10 is a side elevational view of the selecting mechanism with the casing removed and showing some of the parts and portions fragmentarily; Fig. 11 is a sectional view through 11—11 of Fig. 13; Fig. 12 is a sectional view through 12—12 of Fig. 10, and Fig. 13 is a sectional view through 13—13 of Fig. 10.

Like characters of reference refer to similar parts and portions throughout the several views of the drawings.

The vehicle transmission shift members 1 and 2, shift member guide rod 3, casing 4, casing 5, shift member latch member 6, main operating plunger shaft 7, main operating arm 8, latch member 9, spring 10, latch supporting pin 11, tubular casing member 12, electrical switch contact members 13 and 14, spring 15, tapered contact member 16, insulated contact support 17, pin 18, terminals 19 and 20, conductors 21 and 22, casing members 23, 24 and 25, latch members 26 and 27, plunger members 28, springs 29, inner casing 30, spider member 31, ratchet wheels 32, ratchet pawls 33, spring 34, lever 35, pawl 36, dial plate 37, dial plate support 38, spring 39, shafts 40, rotor tumblers 41, and indicating pin 42, constitute the principal parts and portions of my combination locking mechanism for vehicles.

The casing 4 may be the conventional casing for supporting the transmission gear shift mechanism, and shiftably mounted thereon are the shift members 1 and 2, which may also be of the conventional type, shiftably mounted upon the shift member supporting rod 3, which is supported at its opposite ends in the casing 4. These shift members 1 and 2, it will be noted, engage the transmission gearing A in the conventional manner. The shift members 1 and 2 are provided with notches in their adjacent sides near one end, into which the reduced end 6ª of the latch 6 is adapted to enter when said latch member is down in its downward position, and is so positioned that when the shifting mechanism is in neutral position, these notches in the shift members are in the proper position to receive the portion 6ª of the latch member 6. Otherwise said latch member is prevented from moving downwardly by being supported on the upper side of the shift members 1 and 2.

Rigidly secured to the casing 4 is another casing member 5, which, in this case, is secured by means of bolts 5ª from the interior and bolts 5ᵇ from the exterior, the fastening and the shape of the casing, however, being dependent upon the shape of the transmission gear shift mechanism casing at this point. The casings 4 and 5 are provided with internal bores 4ᶜ and 5ᶜ in which is reciprocally mounted the main operating shaft 7.

Near the lower end of the shaft 7 is a pin 7ª, extending therethrough, which serves as a support and guide for the latch member 6, and the latch member 6 is reciprocally mounted on the extended reduced end of the member 7, thus permitting slight relative movement of the member 6 on the main operating shaft 7. Mounted in the member 4 and resting against the reduced end of the member 7 is a spring 6ᵇ, which tends to hold the latch member downwardly on the member 7. It will be noted that the latch 6 is provided with a vent 6ᶜ to relieve the oil that might work up into said latch member.

Rigidly secured in the upper end of the casing 5 is the one end of a tubular casing member 12, and its other end extends upwardly some distance and is secured in a casing member 25 on the upper end of said casing member 12. This casing member 12 is provided with a slot 12ª therein, through which extends an arm member 8, which is rigidly secured to the main shaft 7 in the casing 12, and on its extended end is provided a knob 8ª, which serves as a handle to facilitate the movement of the arm. This arm member 8, it will be noted, is preferably a flat member rounded at its edges, as shown best in Fig. 5 of the drawings.

Mounted in the casing 12 below the slot 12ª is a pin 11, which serves as a pivotal mounting for the latch member 9, which is in bellcrank form and provided with a member 9ª, which extends normally upwardly and is provided with an extended curved lug portion 9ᵇ, which is adapted to extend over the upper edge of the arm member 8 and hold it in a downward position, as shown best in Fig. 5 of the drawings. The other member is provided with a knob 9ᶜ, which serves as a hand hold for operating the latch member 9. Secured to the latch member 9 and around the pin 11 is a torsion spring 10, which tends to hold the portion 9ᵇ of the latch 9 so that it will engage the upper edge of the arm 8 when released at all times, it being noted that the upper edge of this member is curved so that the arm moves downwardly without engaging said latch, and that the latch member 9 cannot engage the arm member 8 when the arm member 8 is in its upward position. The latch member 9 rests against a washer 12ᵇ. Secured on the outer surface of the member 12 and outside of the latch on the pin 11 is another washer 10ª, all as shown best in Figs. 3 and 5 of the drawings.

Interposed between the arm member 8 and the upper end of the casing member 5 is a spring 8ᵇ, which tends to hold the arm 8 upwardly and, therefore, the main shaft 7.

The casing 5 is provided near its upper end with a chamber 5ᵉ, surrounding the shaft 7, and in the one side is mounted an electric switch mechanism, as follows:

Secured to the shaft on one side is a lug member 17ª in which is secured an insulated contact support 17, upon the upper end of which is secured an electrical contact member 16, which is tapered at its upper end, as shown best in Figs. 3 and 4 of the drawings. The one side of the chamber 5ᵉ is enclosed by means of a cover member 5ᵈ in which are mounted the terminal members 19 and 20, upon which are pivotally mounted respectively, the contact members 13 and 14, which are provided with inwardly extending ends 13ª and 14ª, which are provided with right angle portions, which are adapted to engage the tapered end of the contact member 16 when it is moved upwardly, as shown by dotted lines in Fig. 4 of the drawings. These members 13 and 14 are held inwardly at their free ends by means of the spring 15, which connects the two members, and there are provided stop members 15ª to prevent these free ends from moving too far. The terminal members 19 and 20 extend out through the cover member 5ᵈ to which are secured the electrical conductors 21 and 22, which connect with the ignition system of the vehicle, thus providing a switch means so arranged and constructed that when the main shaft 7 is down, so that the transmission mechanism is held in neutral position, the contact members 13 and 14 are not connected by means of the contact 16. Thus, the circuit is broken and the vehicle ignition system is inoperative.

Mounted over the terminals 19 and 20 is a casing 5ᵉ, covering said terminals and supported by means of screws 5ᶠ, which extend into the casing 5.

Mounted on the casing member 25 is an annular casing member 23, as shown best in Figs. 1, 2 and 9 of the drawings, and secured on the upper edge of the casing member 23 is a casing member 24. It will be here noted that these members 23 and 24 are rigidly secured together or integral with each other. The casing member 23 is provided near its lower edge and opposite sides with apertures 23ª and 23ᵇ in which are adapted to extend the outer ends of the latch members 26 and 27, as shown best in Fig. 9 of the drawings. These latch members 26 and 27 are reciprocally mounted in the wall 25ª, secured to and surrounding the casing member 12, and in guide members 26ᵇ and 27ᵇ secured to the member 25 near its periphery. Said latch members 26 and 27 are provided with springs 26ª and 27ª, respectively, which are adapted to force said latch members outwardly into the apertures 23ª and 23ᵇ, respectively. Said latch members are also provided with pins 26ᶜ and 27ᶜ, which are adapted to limit the outward movement of said latch members 26 and 27 and serve as supports for the one end of said springs.

The shaft 7, it will be noted, is provided with a bore 7ᵇ therethrough, which permits the inner ends of the members 26 and 27 to enter said shaft, thus permitting the latch members 26 and 27 to move inwardly for removing the casing, consisting of the members 23 and 24, when the shaft 7 is in certain relative and unlocked position in said casing. This is accomplished by removing the knobs 28ª on the upper ends of the plunger members 28 and pressing the members 26 and 27 inwardly.

Mounted centrally in the casing member 23 and surrounding the upper end of the shaft 7 is an inner casing member 30, which extends upwardly to the upper end of the casing member 23 and against the member 24. This member 30 is preferably integral with the casing member 25 and is preferably polygon-shaped, in this case square, and at its upper end is provided with an annular flange 30ª, which fits loosely in the casing member 23 and rests against the member 24 at its upper side.

Revolubly mounted on the interior of the casing member 30 on each flat face is a circular tumbler member 41 supported upon a shaft 40 extending through the side wall of the casing member 30 and secured thereon by means of threads 40ª and locked with screws 41ª. Each of these members is provided with a plurality of pins 41ᵇ in its periphery, which are adapted to engage a spider member 31 to prevent feeling out the combination, and each is provided with a slot 41ᶜ in one side thereof. Secured on the upper end of the shaft 7 is said spider member 31, the extended ends of which are adapted to fit in said slot 41ᶜ in the member 41 when the shaft 7 is in its upward position, as shown best in Fig. 9 of the drawings.

Mounted centrally in the member 24 and extending downwardly adapted to engage the upper end of the shaft 7 is a small shaft 42, which extends out through the member 24 and is provided on its upper end with an enlarged portion 42ª, thus providing means from the upper side for determining whether the locking mechanism is in locked or unlocked position, it being noted that when the shaft is up and the mechanism is in unlocked position, the member 42ª extends upwardly above its supporting boss 42ᵇ, and when the shaft 7 drops, this member 42 drops and indicates that the mechanism is in locked position.

Mounted near the outer end of the shaft 40 is a dial holder 38, which is provided with an outwardly extending flange 38ª and in which is mounted a dial member 37. Mounted on the end of said shaft 40 is a collar 40ᶜ secured thereon by means of a pin 40ᵈ. Mounted in the member 37 is a lug 37ᵈ to which is secured one end of a torsion spring 39, and the other end is wound around the shaft 40 and secured to a lug 32ᵇ on the ratchet wheel 32, which is secured on the shaft 40.

Engaging the normally lower side of the ratchet wheel 32 is a ratchet pawl 33, which ratchet pawl 33 is pivotally mounted on the inner wall 30 on a screw 33ª and is provided with an extended portion adapted to engage the teeth of the ratchet wheel 32, as shown best in Fig. 11 of the drawings. It is provided with an extended arm member 33ᵇ, to the extended end of which is secured the one end of a spring 34, the other end of said spring being secured to said inner wall 30, which spring tends to hold said ratchet pawl in engagement with the teeth of the ratchet wheel. This ratchet pawl 33 is provided with an extended portion 33ᶜ, which is provided with a round lug portion which extends into and through a slot 30° in the side wall of the inner casing 30, which slot, it will be noted, is on a radius with the pivotal mounting of said pawl so that the pawl 33 may be shifted out of engagement with the teeth of the ratchet wheel 32.

Pivotally mounted on the outer side of the wall of the inner casing 30 at one side is a lever member 35 in curved form, as shown best in Fig. 11 of the drawings. This lever is positioned between the ratchet wheel 32 and the outer surface of the inner casing 30 and is adapted to move in this position on its pivotal mounting. It is provided near its free end with a ratchet pawl 36, which is pivotally mounted on said lever on a pin $36^a$ and is provided with a torsion spring $36^b$ tending to hold it against a stop member $36^c$. It will be noted that with the pivotal movement of the lever 35, the end $36^d$ engages the teeth of the ratchet wheel 32. The extended end of this lever 35 is provided with a reduced end portion $35^b$, which is adapted to fit in a hole $28^b$ in the plunger member 28, as shown best in Fig. 11 of the drawings. This hole $28^b$, it will be noted, is provided with outwardly tapering ends providing for the pivotal movement of the portion $35^b$ relative to the member 28. This plunger 28 is provided on its outwardly extending end with a knob $28^a$ to be engaged by the hand for operating said plunger. Said plunger 28 is supported in the flange $30^a$ at its upper end and by means of an eye member $28^c$, secured to the casing member 30 near its lower side, and said plunger is also provided with a collar $28^d$. Secured intermediate the ends of the plunger and interposed between this collar and the eye member $28^c$ is a spring 29, which tends to hold the plunger 28 upwardly at all times.

The inwardly extending portion $33^c$ of the pawl 33 extends inwardly through the slot $30^c$ a sufficient distance to be engaged by the ends of the spider 31 when said spider is lowered by the lowering of the shaft 7, as shown best by dotted lines in Fig. 9 of the drawings, thus releasing the ratchet pawl 33 so that it does not engage the ratchet wheel 32 when said shaft 7 is down, thus releasing the ratchet wheel 32, whereupon the spring 39 revolves said wheel 32 until the lugs $32^b$ and $37^d$ engage each other.

Secured on the support 38, by means of screws $38^b$, is a plate $38^d$, which is provided with a round boss $38^e$ extending inwardly and fitting at one side in the semicircular notches $37^c$ in the dial plate 37 and its other side extending into a similar notch in the supporting member 38, thus forming a lock for preventing the dial plate 37 from turning relative to the plate $38^d$, which plate $38^d$ must be loosened and raised for turning the dial for adjustment purposes. Also secured on this plate 38 is a pointer member $38^f$, which points toward the characters on the dial 37, so that the character to which the dial is set is easily determined.

It will be noted that the members 25 and 30 are secured to the casing tube 12 by means of a screw $30^f$, which passes through the wall of the member 30 and into and through the wall of the tube casing 12, so that the members 12 and 25 and 30 cannot be turned relative to each other without shearing the screw.

The operation of my combination locking mechanism is as follows:

The arm 8 is the operating arm. The conventional ignition switch is removed from the vehicle, and the only ignition switch is the one operated by the operating arm 8. When the vehicle is stopped, the transmission gear shift mechanism must be placed in neutral position, whereupon the notches in the shift levers are in position to receive the end $6^a$ of the latch member 6. Then the arm 8 is pressed downwardly in the slot $12^a$ until it reaches a position so that the latch 9 engages the upper edge of the arm 8, as shown best in Fig. 5 of the drawings. This arm 8, however, is pressed a little beyond this position when the latch 6 is in engagement with the notches in the transmission shift members and securely locks the shift mechanism of the transmission gears. At this time the arms of the spider member 31 are moved downwardly and engage the lugs $33^c$ of the ratchet pawl 33, releasing the ratchet wheel 32, and the spring 39 revolves said wheel 32 until the lugs $32^b$ and $37^d$ engage each other, thus turning the tumbler members 41 so that the spider members 31 are out of alinement with the slots $41^c$ in the members 41, so that the shaft $7^b$ cannot be returned and, therefore, the transmission is locked. With the further continued movement of the arm downwardly after the transmission is locked, the contact member 16 has been carried down to a point near the apex of said contact member 16, and it is quickly released and drops by gravity to the position shown by solid lines in Fig. 4 of the drawings and out of engagement with the members 13 and 14, and the circuit is broken to the ignition mechanism, it being noted that the only means of switching the ignition is the arm 8, and the switching effect takes place immediately after the locking of the transmission has been effected, it being also noted that the pin $7^a$ and elongated holes in the latch 6 permit slight longitudinal movement of the latch member relative to the member 7 to provide for this action. Thus, the transmission is locked in neutral position and the ignition to the vehicle is cut off with the movement of the arm 8 downwardly. The arm 8 is then released and returns to the position shown in Fig. 5 of the drawings in engagement with the latch 9 by reason of the spring $8^b$, as this arm member must be up in engagement with this latch member 9 before the plunger may be operated for releasing the lock mechanism.

When it is desired to release the lock, the several plunger members 28 are moved inwardly the proper number of times, which operates the lever 35 and, therefore, the pawl 36 engages the ratchet wheel 32 and turns the same one notch at a time; that is, one notch with each downward movement of the plunger until all of the notches 41° are directed downwardly so that the arm members on the spider 31 will engage the slots, whereupon, upon releasing the latch 9 by downward pressure on the member 9°, the arm 8 is moved upwardly by the spring 8ᵇ at the same time the contact 16 engages the contact members 13 and 14, closing the circuit to the ignition, and the vehicle is ready for shifting the gears and for operation.

It will be here noted that the dials 37 may be positioned in various combinations relative to each other and thereby determine the number of times certain of the plungers must be depressed in order to properly aline the slots 41 to receive the four members of the spider 31.

It will also be noted that there may be any number of these dial plates 37 desired. In this case there are shown four, but there may be any number desired from one to a dozen, thereby providing a large number of separate combinations, which may be changed by the operator of the vehicle when desired, or a large number of changes for different vehicles.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a vehicle locking mechanism, a casing, a plunger shaft reciprocally mounted therein, a latch member shiftable slightly relative thereto and shiftable thereby adapted to engage and lock the vehicle gear shifting mechanism, means for manually reciprocating said shaft, plunger actuated means for controlling the movement of said shaft independently of said manually operated means, and latch means adapted to engage said manually operated means tending to hold said manually operated means in certain positions.

2. In a vehicle locking mechanism, a casing, a plunger shaft reciprocally mounted therein, shiftable means in connection with one end of said shaft for engaging and locking a vehicle gear shifting mechanism, means extending from one side of said casing for manually operating said shaft, means for controlling the movement of said shaft independently of said manually operated means, and an ignition switch operated by said shaft.

3. In a vehicle locking mechanism, a reciprocating member, and combination lock means for controlling the movement of said reciprocating member consisting of a revoluble member provided with a slot at one side thereof, means mounted on said reciprocating member and adapted to move in and out of said slot, means for automatically revolving said revoluble member when said means is out of said slot, and means for repositioning said revoluble member.

4. In a vehicle locking mechanism, a reciprocating member, and combination lock means for controlling the movement of said reciprocating member consisting of a revoluble member provided with a slot at one side thereof, means mounted on said reciprocating member and adapted to move in and out of said slot, means for automatically revolving said revoluble member when said means is out of said slot, and combination means for repositioning said revoluble member.

5. In a vehicle locking mechanism, a reciprocating member, and combination lock means for controlling the movement of said reciprocating member including a spider member with extended ends secured to said reciprocating member, a plurality of revoluble members, each provided with a slot adapted to receive one of the extended arms of said spider member when said revoluble members are in a certain position relative thereto, means for automatically turning said revoluble members out of alined position, and plunger, ratchet and pawl means for repositioning said revoluble members.

6. In a vehicle locking mechanism, a reciprocating member, combination lock means for controlling the movement of said reciprocating member, and an ignition switch in connection with said reciprocating member consisting of a pair of pivotally mounted contact members, resilient means for holding them in contiguous position relative to each other, and a tapered contact member carried by said reciprocating member adapted to be shifted between the contiguous portions of said contact member for closing an electric circuit when said reciprocating member is in certain positions and disengaged when said contact member is in an opposite position.

7. In vehicle locking mechanisms, the combination with the conventional gear shifting members of a vehicle, of a reciprocating member engaging said shifting members, an arm member secured to said reciprocating member adapted to facilitate its reciprocation, an electric switch contact member movable with said reciprocating member and movable relative thereto, and a switch member adapted to be engaged by said contact member for opening and closing the switch with the reciprocation of said reciprocating member.

8. In vehicle locking mechanism, the combination with the conventional gear shifting members of a vehicle, of a reciprocating member engaging said shifting members, an arm member secured to said reciprocating member adapted to facilitate its reciprocation, an electric switch contact member movable with said reciprocating member and movable relative thereto, a switch member adapted to be engaged by said contact member for opening and closing the switch with the reciprocation of said reciprocating member, and combination lock means engaging said reciprocating member for controlling the movement of said reciprocating member, including revoluble tumblers provided with slots in one side adapted to be engaged by said reciprocating member, means tending to turn said revoluble tumblers out of engaging position when said reciprocating member is moved to locking position and plunger for lever means in connection with said revoluble tumbler members, for returning them to engaging positions.

9. In a vehicle locking mechanism, a gear shift member with engaging portions, a reciprocating member with an engaging portion adapted to engage therewith and lock said gear shifting mechanism, combination lock means for controlling the movement of said reciprocating member, an ignition switch in connection with said reciprocating member consisting of a pair of pivotally mounted contact members, resilient means for holding them in contiguous position relative to each other, a tapered contact member carried by said reciprocating member adapted to be shifted between the contiguous portions of said contact member for closing an electric circuit when said reciprocating member is in certain position, and disengaged when said contact member is in an opposite position, and automatically locking it when it is in its inward or locked position.

10. In a vehicle locking mechanism, a gear shift member with engaging portions, a reciprocating member with an engaging portion adapted to engage therewith and lock said gear shifting mechanism, an ignition switch in connection with said reciprocating member consisting of a pair of pivotally mounted contact members, resilient means for holding them in contiguous position relative to each other, a tapered contact member carried by said reciprocating member adapted to be shifted between the contiguous portions of said contact member for closing an electric circuit when said reciprocating member is in certain position, and disengaged when said contact member is in an opposite position, combination lock means for controlling the movement of said reciprocating member, and automatically locking it when it is in its inward or locked position, and plunger, lever, shaft and tumbler means for releasing said reciprocating member, whereby it is returned to unlocked position.

11. In a vehicle locking mechanism a gear shift member with engaging portions, a reciprocating member with an engaging portion adapted to engage therewith and lock said gear shifting mechanism, an ignition switch in connection with said reciprocating member consisting of a pair of pivotally mounted contact members, resilient means for holding them in contiguous position relative to each other, a tapered contact member carried by said reciprocating member adapted to be shifted between the contiguous portions of said contact member for closing an electric circuit when said reciprocating member is in certain position, and disengaged when said contact member is in an opposite position, combination lock means for controlling the movement of said reciprocating member, and automatically locking it when it is in its inward or locked position, plunger, lever, shaft and tumbler means for releasing said reciprocating member whereby it is returned to unlocked position, and means for controlling the movement of said plunger means.

In testimony whereof, I have hereunto set my hand at San Diego, California, this 11th day of February, 1927.

ZELIE RIDDLE.